United States Patent [19]
Yagi et al.

[11] Patent Number: 4,967,406
[45] Date of Patent: Oct. 30, 1990

[54] SUBSIGNAL TRANSMITTING SYSTEM

[75] Inventors: Takeshi Yagi; Toshio Tamura, both of Otawara, Japan

[73] Assignee: Fujitsu Limited, Kawasaki, Japan

[21] Appl. No.: 407,943

[22] Filed: Sep. 14, 1989

[30] Foreign Application Priority Data

Sep. 14, 1988 [JP] Japan ................................ 63-230733

[51] Int. Cl.$^5$ .............................................. H04J 3/02
[52] U.S. Cl. ......................................... 370/16; 370/13;
371/8.2; 371/11.2
[58] Field of Search ..................... 370/13, 13.1, 110.4,
370/77, 16; 371/7, 8.1, 8.2, 11.2; 340/825.01,
827

[56] References Cited

U.S. PATENT DOCUMENTS

| 4,417,348 | 11/1983 | Abbruscato | 340/825.01 |
| 4,611,324 | 9/1986 | Giacometti et al. | 370/13 |
| 4,680,776 | 7/1987 | Ikeuchi et al. | 370/16 |
| 4,763,326 | 8/1988 | Krick | 370/110.4 |
| 4,774,703 | 9/1988 | Force et al. | 370/16 |
| 4,837,760 | 6/1989 | Reid et al. | 370/16 |

FOREIGN PATENT DOCUMENTS 63-283253  11/1988  Japan .
63-283255  11/1988  Japan .

Primary Examiner—Douglas W. Olms
Assistant Examiner—Min Jung
Attorney, Agent, or Firm—Staas & Halsey

[57] ABSTRACT

A subsignal transmitting system had working lines for respectively transmitting multiplexed signals each including a main signal, and had at least one protection line for transmitting one of the multiplexed signals when it is detected that the transmitting conditions of one of the working lines along which the signals are being transmitted are deteriorated. To realize the switching of the subsignal transmitting through the protection line, the system comprises a switching signal transmission line for transmitting, in the direction opposite to the transmission of the multiplexed signals, a switching signal indicating which one of the working lines is too deteriorated for transmission of the corresponding multiplexed signal, a transmitting side subsignal switching unit for outputting one of the input subsignals to one of the working lines respectively and for outputting, in response to the switching signal, one of the input subsignals to the protection line; and a receiving side subsignal switching unit, operatively connected to the subsignal output terminals, for outputting the subsignal through the protection line to, in response to the switching signal, the corresponding one of the subsignal output terminals, the remaining subsignals through the working lines being output to the remaining output terminals, respectively.

12 Claims, 5 Drawing Sheets

Fig. 4B(a) SUB. SIGNAL
Fig. 4B(b) C L
Fig. 4B(c) SWITCHING BIT
Fig. 4B(d) OUTPUT BIT

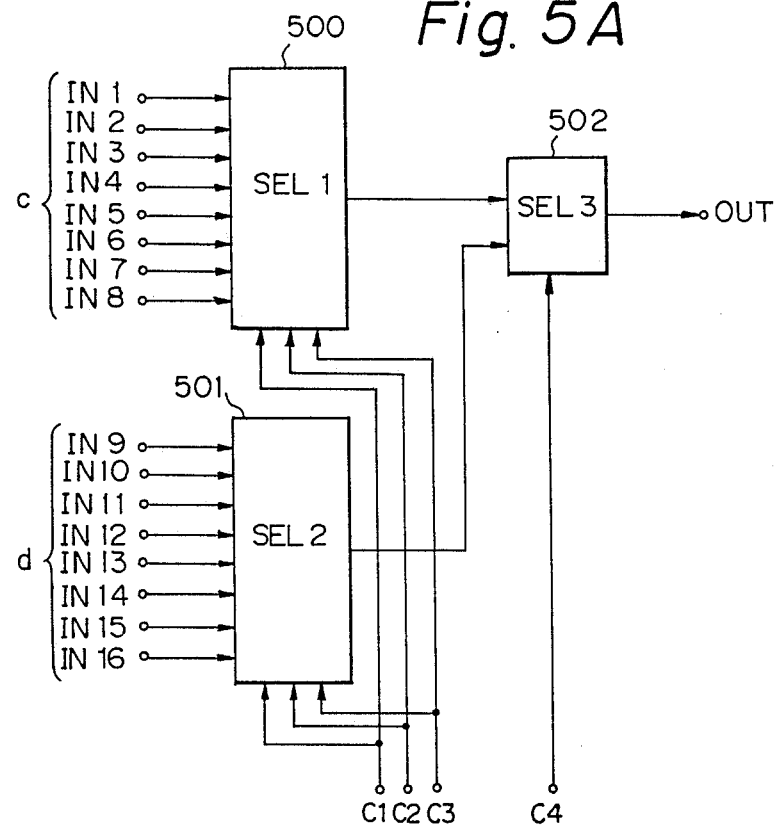

SUBSIGNAL TRANSMITTING SYSTEM

BACKGROUND OF THE INVENTION (1) Field of the Invention

The present invention relates to a digital radio communication system utilizing a multi-value QAM modulation system, and more particularly to a subsignal transmission system.

(2) Description of the Related Art

In a digital radio communication system, one or more protection lines are provided to correspond to a plurality of working lines to prevent deterioration of a transmitted signal due to fading or equipment fault. To switch from one of the working lines to the protection line subsignals such as a control signal superimposed on one of the working lines are used.

Currently, radio communications are effected so frequently that it has been an important goal to improve the utilization rate of frequencies within a predetermined frequency band. One of the techniques to improve the utilization efficiency is to use additional signals in the subsignals such as orderwire signals or way side signals which are also superimposed on one of the working lines.

Conventionally, these subsignals are superimposed on only one of the working lines. On the other working lines, dummy signals having no meaning are superimposed.

However, from the viewpoint of improving the efficiency of utilization of the limited frequency band, it is further required to superimpose subsignals on the other working lines. Although the number of channels for the subsignals is very small in comparison with that of the main signals so that the amount of data which can be transmitted through the subsignal channels is small, the additional signals can be advantageously transmitted between short distances.

SUMMARY OF THE INVENTION

An object of the present invention is to effectively utilize predetermined frequency bands by providing a subsignal transmitting system in which separate subsignal s are superimposed on main signals transmitting through two or more working lines and switching means is provided for switching not only the main signal but also the subsignals when the line is switched.

To attain the above object, there is provided. according to the present invention, a subsignal transmitting system having a plurality of working lines for respectively transmitting multiplexed signals each including a main signal, and having at east one protection line for transmitting one of the multiplexed signals when it is detected that the transmitting conditions of one of the working lines along which the signals are being transmitted are deteriorated or unsatisfactory. To realize this, according to the present invention, the system comprises a plurality of subsignal input terminals for respectively receiving input subsignals; a plurality of subsignal output terminals for respectively outputting subsignals transmitted through the working lines or the protection line; a switching signal transmission line for transmitting, in the direction opposite to the transmission of the multiplexed signals, a switching signal indicating which one of the working lines is deteriorated for transmission of the corresponding multiplexed signal; a transmitting side subsignal switching unit, operatively connected to the subsignal input terminals, for outputting one of the input subsignals to one of the working lines respectively and for outputting, in response to the switching signal, one of the input subsignals to the protection line; and a receiving side subsignal switching unit, operatively connected to the subsignal output terminals, for outputting the subsignal through the protection line to, in response to the switching signal, he corresponding one of the subsignal output terminals. The remaining subsignals through the working lines being output to the remaining output terminals, respectively.

The switching signal transmission line is an opposite direction protection line for transmitting an opposite direction multiplexed signal including an opposite-direction main signal and an opposite-direction subsignal. The switching signal is included in the opposite-direction subsignal.

The subsignals include switching signals each indicating whether the corresponding one of the working lines is deteriorated for transmission of the corresponding multiplexed signal.

The subsignals further include orderwire signals, and way side signals.

The system further comprises a transmitting side main signal switching unt having a plurality of main signal input terminals and a plurality of output terminals operatively connected to the input sides of the plurality of working lines and he protection line, for connecting the main signal input terminals to the input sides of the working lines respectively and for selectivey connectng, in response to the switching signal, the corresponding one of the man signals to the input side of the protection line; and a receiving side main signal switching unit having a plurality of main signal output terminals, for connecting, in response to the switching signal, the output sides of the working lines except for the deteriorated working line to the corresponding main signal output terminals and for selectively connecting. In response to the switching signal, the output side of the protection line to the corresponding main signal output terminal.

The system further comprises transmitting terminal equipment, operative}y connected to the transmitting side switching unit, for inserting the input subsignal s into the main signals to form and transmit the multiplexed signals; a receiving terminal equipment unit, operatively connected to the receiving side switching unit, for dropping the subsignals from the multiplexed signals to output the output main signals and the output subsignals; and at east one intermediate repeater unit. operatively connected between the transmitting terminal equipment unit and the receiving termina equipment, for dropping necessary subsignals from the multipexed signals and for inserting necessary subsignal]s into the multiplexed signals.

The transmitting side subsignal switching unit comprises: a switching signal detecting unit. operatively connected to the switching signal transmission line, for detecting the switching signal; and a first subsignal selecting unit, operatively connected to the switching signal detecting unit and to the subsignal input terminals, for selecting, in response to the detected switching signal. a subsignal corresponding to the deteriorated working line to be inserted into the protection line.

The receiving side subsignal switching unit comprises: a plurality of subsignal selecting units, provided to respectively correspond to the plurality of working lines and operatively connected to the plurality of working lines, to the protection line and to the output subsignal terminals, for selecting, in response to the switching signal from the receiving side switching unt, the subsignal]s from the working lines or from the protection line.

The system further comprises intermediate switching signal detecting unit, operatively connected to the switching signal transmission line (D—D), for detecting the switching signal; a plurality of dropping subsignal selecting units. provided to respectively correspond to the plurality of working lines and connected to the intermediate switching signal detecting unit, for selectively dropping, in response to the switching signal from the intermediate switching signal detecting unit, subsignals from the working lines or from the protection line; and an inserting subsignal selecting unit, operatively connected to the intermediate switching signal detecting unit and to the protection line, for selectively inserting in response to the switching signal from the intermediate switching signal detecting unit, one of the input subsignals into the protection line.

The transmitting termina equipment unit comprises, corresponding to each of the working lines, data service channel units for multiplexing the corresponding input main signal with the corresponding input subsignal to form a multiplexed signal, and a transmitter for transmitting the multiplexed signal to the corresponding working line, and comprises, corresponding to the protection line, a data service channel unit for multiplexing the selected main signal with the selected subsignal.

The intermediate repeater unit comprises, corresponding to each of the working lines and the protection line, a receiver for receiving the multipexed signal from the corresponding transmitter, a data service channe unit for dropping the subsignal from the multiplexed signal output from the receiver and for inserting an input subsignal into the corresponding working line, and a transmitter for transmitting the multiplexed signal from the data service channel unit to the corresponding working line.

The receiving termina equipment unit comprises, corresponding to each of the working lines and the protection line, a receiver for receiving the multiplexed signal from the corresponding transmitter in the intermediate repeater unit. and a data service channel unit for dropping the subsignal from the multiplexed signal output from the receiver.

BRIEF DESCRIPTION OF THE DRAWINGS

The above object and features of the present invention will be more apparent from the following description of the preferred embodiments with reference to the drawings, wherein:

FIG. 4B is A timing diagram of the operation of circuit of FIG. 4A;

FIG. 5 is a block diagram showing a selecting circuit shown in FIG. 2; and

FIG. 5B is a table diagramming signals in the circuit of FIG. 5A.

DESCRIPTION OF THE PREFERRED EMBODIMENTS

Figure 1:
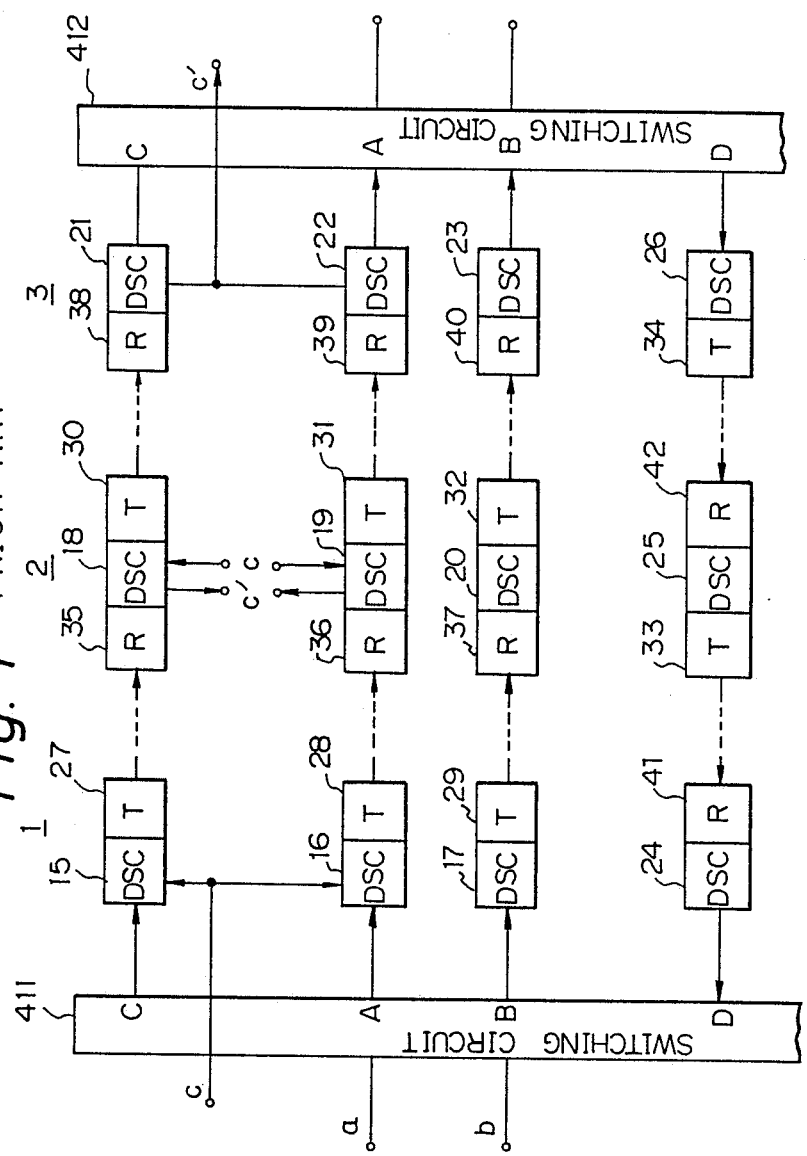
FIG. 1 is a hock diagram showing a conventional subsignal transmitting system.

For better understanding of the present invention, a conventional digital radio communication system will first be described with reference to FIG. 1.

n FIG. 1, 411 and 412 are switching circuits for switching lines when the quality of transmitting signals is deteriorated. 15 to 26 are data service channel units (hereinafter referred to as DSC), 27 to 34 are transmitters. 35 to 42 are receivers. A and B are working lines( in the figure, only two working lines are shown for he sake of simplicity), C is an up-word protection line, D is a down-word protection line (note that the down word working line is not shown in the figure for the sake of simplicity), a is a main signal transmitted through the working line A, B is a main signal transmitted through the working line B, c is an input subsignal, and c' is an output subsignal. Also, 1 is transmitting side terminal equipment, 2 is an intermediate repeater, and 3 is receiving side terminal equipment.

In operation. The main signals a and b are transmitted through the working lines A and B. The DSC 15 and 16 multiplex the subsignal c with the main signal to transmit the multiplexed signal. The multiplexed subsignal is included in service channels in the multiplexed signals. Thus, through the protection line C, the same subsignal as that multiplexed with the main signal a is transmitted in parallel with the working line A. Through the working line B, no subsignal is superimposed.

At the intermediate repeaters, the receivers 35 to 37 receive the decayed signals to demodulate, regenerate and remodulate and then transmit them by the transmitters 30 to 32. At this time, the DSCs 18 and 19 drop the subsignal from the multiplexed signal including the main signal a and the subsignal c, and then the modified subsignal or the same subsignal is again inserted into the working line A and the protection line C. The drop and insert process is necessary because the subsignal consists of additional signals such as an orderwire signal, way side signal, and the like which are necessary in the intermediate repeaters, in addition to the switching signal which is transmitted when the quality of The signal on the working line is deteriorated. The orderwire signal is a communication signal between the termina equipment and an intermediate repeater or between intermediate repeaters. The way side signal is a signal which is transmitted with the main signal.

The additional signal is used by a person who deals with this radio communication or is lent to a specified client since it is possiblele and useful in short distance communication between terminal equipment and an intermediate repeater or between intermediate repeaters. The signals transmitted through the intermediate repeaters are received by receivers 38 to 40 in the receiving side terminal equipment 3. At this time, the subsignals are dropped DSCs 21 to 23 at the receiving side terminal equipment.

When the quality of the main signal a or b transmitted through the working lines A or B is deteriorated due to fading or faults in the equipment. a switching signal is transmitted from the receiving terminal equipment to the transmitting terminal equipment so that the frequency band being utilized is switched from the working line A or B to the protection line C.

Thus, the deterioration of the quality of the communication signal can be prevented.

As will be seen from the above description of the conventional radio communication system, conventionally, the subsignal is transmitted through only a single working line A and a protection line C. Through the other working line B, a dummy signal is superimposed on the main signal b in pace of the subsignal. The dummy signal has no meaning. This is because the one working line and the protection line C are sufficient to superimpose the switching signal or the orderwire signal to carry out their functions.

Currently, however, radio communications are effected so frequently that it has been an important subject to improve the rate of utilization of the frequencies within predetermined frequency bands. From the viewpoint of effectively utilizing the limited frequency bands, the additional signals in the subsignal may be used to transmit through not only the single working line A but also through the other working lines for communications. If all of the n working lines (here the number n is a natural number) can convey the subsignals, and when the number of channels for the additional signals in one working line is m, then n x m channels can be used for additional communications.

If, however subsignals are transmitted through the working line B, the subsignals should also be switched from the working line B of the protection line C simultaneous y with the switching of the main signal b from the working line B to the protection line C, when the signal is deteriorated.

Figure 2:
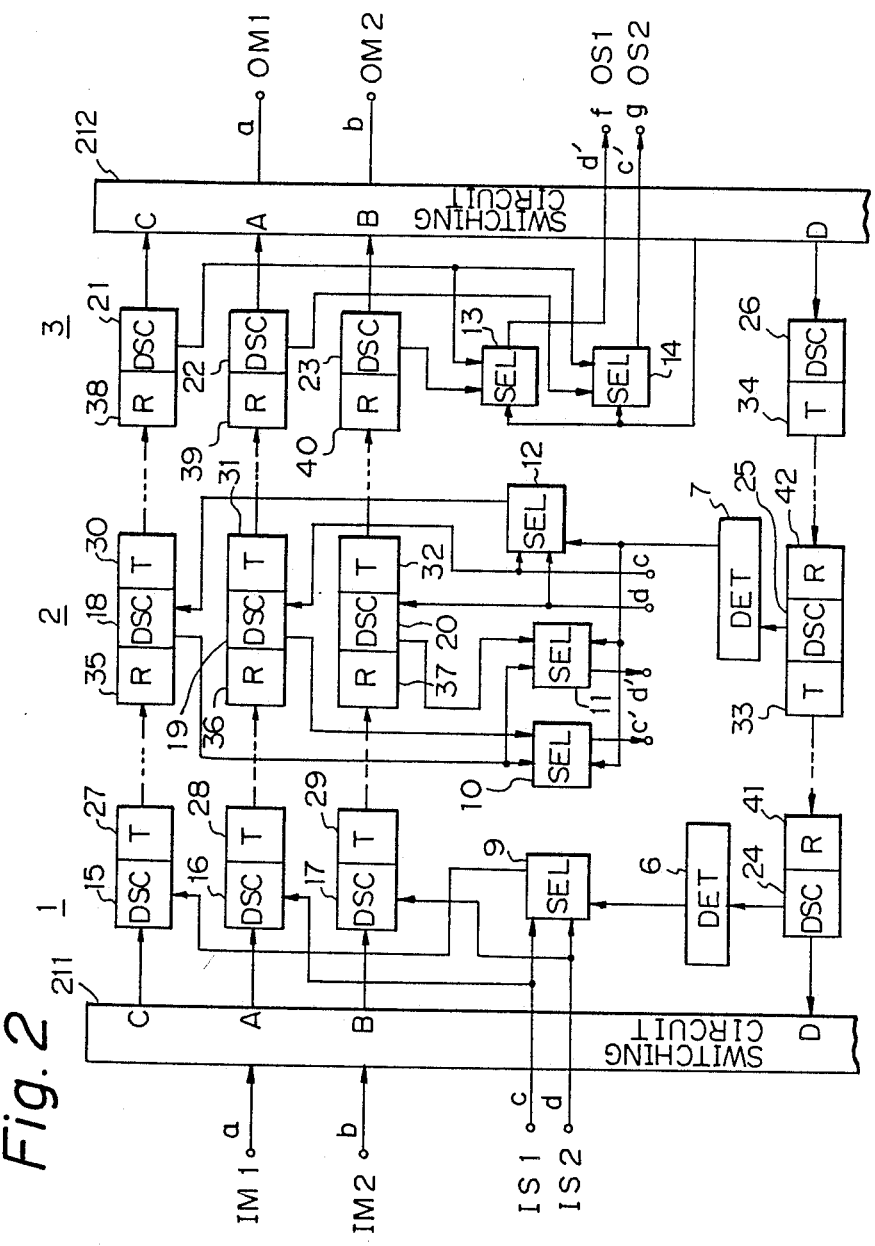
FIG. 2 is a block diagram showing a subsignal transmitting system according to an embodiment of the present invention.

FIG. 2 is a block diagram showing a subsignal transmitting system according to an embodiment of the present invention. In the figure. 211 and 212 are switching circuits, 9 to 14 are selecting circuits, 6 and 7 are switching signal detecting circuits, a and h are main signals applied to main signal input terminals IM1 and IM2, c and d are input subsignals applied to subsignal input terminals IS1 and IS2, and c' and d' are output subsignals. OM1 and OM2 are main signal output terminals; and OS1 to OS2 are subsignal output terminals. For the sake of simplicity, only two working lines and one intermediate repeater are shown; however, there may be more working lines and more intermediate repeaters.

In a normal state, the main signals a and b and the subsignals c and d corresponding to the working lines A and B are transmitted through the working lines A and B respectively, and the selecting circuit 9 selects one of the subsignals for example c in this embodiment. The selected subsignal c is sent to the DSC 15 in which the subsignal c is superimposed on the main signal, for example A in this case, transmitted through the protection line C. The transmitters 27 and 28 transmit the same signal including the main signal a and the subsignal c. The transmitter 29 on the working line B transmits the signal including the main signal b and the subsignal d.

At the intermediate repeater 2. The subsignals c are dropped from the superimposed signals on the protection line C and the working !line A by means of the DSCs 18 and 19. The selecting circuit 10 selects the subsignal c dropped from the DSC 19 when the working line A is used, so as to output the output subsignal c'When the protection line C is used in place of the working line A, the selecting circuit 1U selects the subsignal c dropped from the DSC 18. so as to output the output subsignal c'. The selecting circuit 11 selects the subsignal d dropped from the working line B when the working line B is used. so as to output the output subsignal d'. When the protection line C is used in place of the working line B, the selecting circuit 11 selects the subsignal d dropped from the DSC 20, so as to output the output subsignal d'. The input subsignals c and d are inserted into the main signals A and B at the DSCs 19 and 20. The selecting circuit 12 selects one of the input subsignals c and d to be inserted into the main signal transmitting through the protection line C, depending on whether the working line A or the working line B is switched to the protection line C. The transmitters 30 to 32 transmit the signals with the superimposed subsignals to the receiving terminal equipment 3. At the receiving termina equipment 3, the receivers 38 to 4Q receive the signals transmitting through the respective lines, and the DSC's 21 to 23 drop the respective subsignals. The selecting circuit 13 selects one of the subsignals d from the OSC 23 or from the DSC 21 depending on whether the working line B is used or the protection line C is used in place of the working line B to output the output subsignal d'. The selecting circuit 14 seects one of the subsignals c from the DSC 12 or from the DSC 21 depending on whether the working line A is used or the protection line C is used in place of the working line A to output the output subsignal c'.

Here, in he situation that the working lines A an B are used, assume that the quality of the signal transmitting through the working line B is deteriorated. Then. at the receiving termina equipment 3, the deterioration of the signal transmitting through the working line B is recognized. The switching circuit 212 then transmits a switching signal to instruct switching from the working line B to the protection line C. The switching signal is included in the subsignal which is to be sent through the down-word protection line D. An example of the pattern of the switching signal wi be illustrated later. In response to the switching signal, the transmitting terminal equipment 1 and the receiving terminal equipment 3 switch the signal transmitted from the working line B to the protection 1ine C so as to transmit the main signal b through the protection line C. Simultaneously with this, at the transmitting termina equipment 1, the switching signal detecting circuit 6 detects the switching signal from the superimposed signal transmitting through the down-word protection line D. In response to the detected switching signal, the switching signal detecting circuit 6 recognizes that the working line B should be switched to the protection line C, and based on that recognition, the switching signal detecting circuit 6 outputs a selecting signal to the selecting circut (SEL) q. The selecting signal indicates that the subsignal d should be sent to the protection line C. In response to the selecting signal, the selecting circuit 9 selects the subsignal d and sends it to the protection line C.

At the intermediate repeater 2 also, the switching signal detecting circuit 7 detects the switching signal from the suhsigna transmitting through the down-word protection line D. In response to the detected switching signal, the switching signal detecting circuit 7 also recognizes that the working line B should be switched to the protection line C so as to output selecting signals to the selecting circuits (SEL) 10 and 11. The selecting signal applied z, to the selecting circuit lQ indicates that the subsignal c dropped from the DSC lg on the working line A should be selected to be output as the output subsignal c' and the subsignal d dropped from the DSC 18 on the protection line C should not be output. The selecting signal applied to the selecting circuit 11 indicates that the subsignal d dropped from the DSC 18 on the protection line C should be selected to be output as the output subsignal d' and the subsignal d dropped from the DSC 20 on the deteriorated working line B should not be output. The selecting signal applied to the selecting circuit 12 indicates that the input subsignal d should be inserted into the signal transmitting through the protection line C. The transmitters 30 to 32 transmit the multiplexed signals to the receiving termina equipment 3.

In the receiving termina equipment 3, the selecting circuits 13 and 14 receive a selecting signal directly from the switching circuit 212. In response to the selecting signal, the selecting circuit 13 selects the subsignal d dropped from the DSC 2 on the protection line C and does not select the subsignal d dropped from the DSC on the deteriorated working line B. The selecting circuit 14 seects, in response to the selecting signal from the switching circuit 212, the subsignal c dropped from the DSC 22 on the working line to the selecting circut (SEL) q. The selecting signal A and does not select the subsignal d dropped from the DSC 21 on the protection line C.

As a result of the above-described operation, when the working line B is switched to the protection line C, the subsignal on the working line B is also switched to the protection line C.

Figure 3:
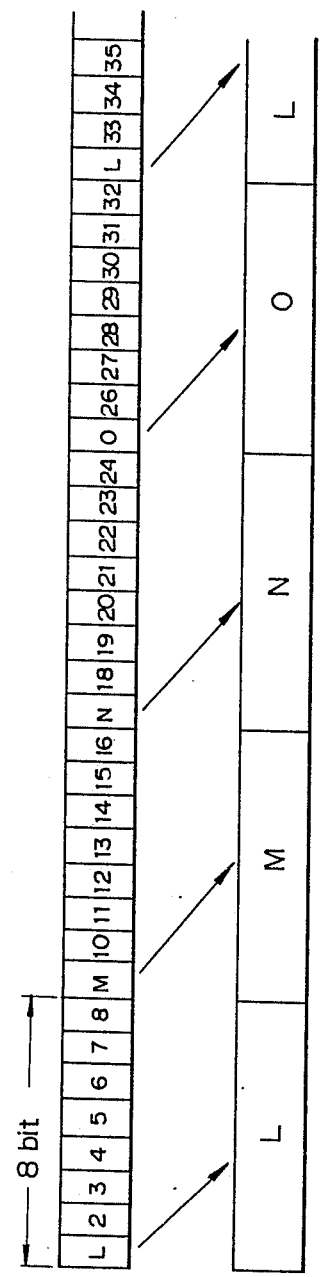
FIG. 3 is a diagram showing an example of the switching signal utilized in the embodiment shown in FIG. 2.

Next, an example of the switching signal is described. FIG. 3 shows an example of the subsignal. As shown in the figure, the subsignal consists of 8 bits in each frame. The upper most bit in each frame is used as a part of the switching signal. As an example, the switching signal consists of four upper most bits L, M, N, and 0. Thus, the pattern of the switching signal is repeated every four frames. The combination of the bits L, M, N, and 0 represents a signal pattern of the switching signal. For example. The combination 1001 is assumed to represent an instruction to switch from the working line B to the protection line C. The selecting circuits 9 to 14 have predetermined logics so that, when the selecting circuits receive this pattern, they select the subsignal d to be inserted or to be dropped into or from the protection line C.

Figure 4A:
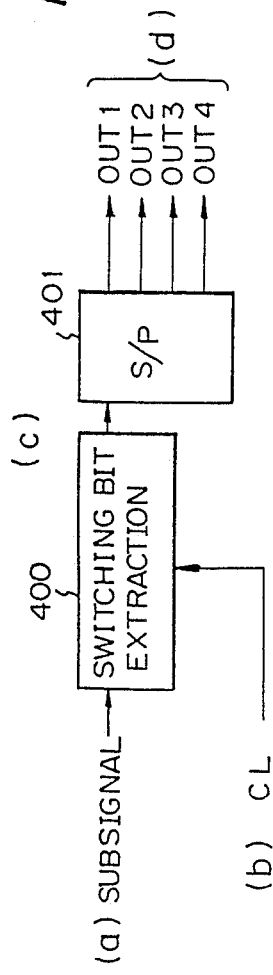
FIG. 4A is a bock diagram showing a switching signal detecting circuit shown in FIG. 2.
Figure 4A:
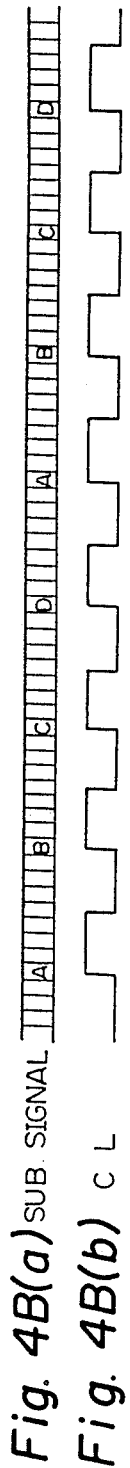
Figure 4A:
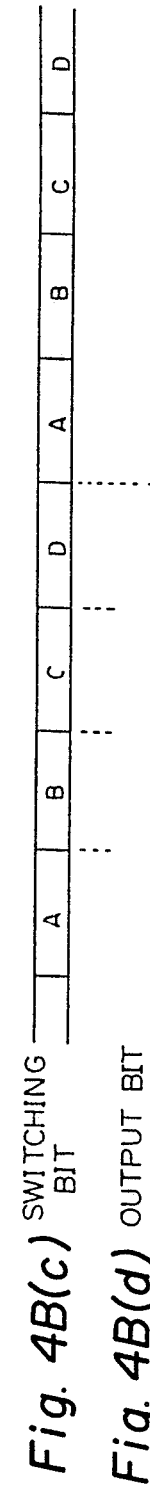
Figure 4A:
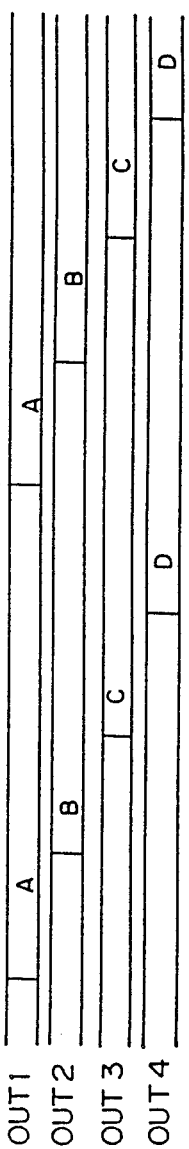

FIG. 4A is a bock diagram showing an example of the constitution of the switching signal selecting circuit 6 or 7 shown n FIG. 2. In the figure, the switching signal detecting circuit consists of a switching bit extracting unit 400 and a serial-to parallel converter 401. The switching bit extracting circuit 400 extracts the switching bit series (c) from the input subsignal series a) in response to a switching bit extracting clock signal CL (b). The serial-to-parallel Converter 401 converts the extracted switching bit series into parael signals OUT1 to OUT4 (d).

FIG. 4B shows the respective signals at respective parts in the switching signal detecting circuit. In the figure. as shown in (a), the subsignal series includes the switching signals A, B, C, ... in every upper-most bit of the eight bits. The switching bit extracting clock signal CL is synchronous with the switching signals. Thus. at the output of the circuit 400, the switching bit series ) is obtained. The circuit 401 converts the serial data ) into the parallel output bits (d) as four parallel bits OUT1 to OUT4 .

FIG. 5A is a bock diagram showing an example of the constitution of one of the selecting circuits 9 to 14 shown in FIG. 2. In the figure, the selecting circuit consists of a first seector (SEL1) 500 for receiving the subsignal c consisting of bits IN1 to IN8 and for selecting one of the 8 bits to be output in response to the lower 3 bits c1, c2, and c3 of the switching signal, a second seector (SEL2) 501 for receiving the subsignal d consisting of H bits IN9 to IN16 and for selecting one of the 8 bits to be output in response to the lower bits c1, c2, and c3 of the switching signal, and a third selector (SEL3) 502 for selecting either one of the outputs from the first and the second seectors 500 and 501 in response to the upper most bit c4 of the switching signal.

FIG. 5B is a take diagram showing the relation between the input switching signal and the selected output at the output terminal OUT of the third selector ("SEL 3") 502. In the figure, H represents the logical high level and L represents the logical low level. For example, when the switching signal}s c1 to c4 are L,L,L,H, then the output bit from the seector 502 is IN1 in the subsignal c. For The other combinations, the selected output bits will be easily understood from the table in FIG. 5B.

From the forgoing description. it will be apparent that, according to the present invention, predetermined frequency bands can be effectively utilized by providing a subsignal transmitting system in which separate subsignals are superimposed on main signals transmitting through two or more working lines and switching means is provided for switching not only the main signal but also the subsignals when the line is switched. Accordingly. The area where dummY bits are conventionally inserted can effectively be used for transmitting subsignals.

The present invention is not restricted to the above-described embodiment but various modifications are possible without departing from the spirit of the present invention. For, example, is possible to superimpose the separate subsignals on any number of the working lines.

We claim:

1. A subsignal transmitting system having a plurality of working lines for respectively transmitting corresponding ones of a plurality of multiplexed signals, each including a main signal, and having at least one protection line for transmitting an associated one of said plurality of multiplexed signals when it is detected that the transmitting conditions of one of said working lines along which an associated one of said multiplexed signals is being transmitted are deteriorated, each of the working protection liens having respective input sides and output sides and wherein each of said plurality of multiplexed signals includes a subsignal multiplexed with a corresponding said main signal, said subsignal transmitting system comprising:

a plurality of subsignal input terminals for respectively receiving input subsignals;

a plurality of subsignal output terminals for respectively outputting corresponding subsignals, variously as transmitted through associated ones of said plurality of working lines or a respectively associated said protection line;

a switching signal transmission line for transmitting, in the direction opposite to the direction of transmission of said multiplexed signals, a switching signal indicating which one of said working lines is too deteriorated for transmission of the corresponding multiplexed signal;

transmitting side subsignal switching means operatively connected to said subsignal input terminals, for outputting a selected one of said input subsignals to a respectively associated said protection line in response to said switching signal for insertion of the selected input subsignal into the main signal transmitted in said protection line, and for outputting the remaining subsignals respectively corresponding to said working lines so as to be inserted into the main signals in said respectively corresponding lines;

receiving side subsignal switching means, operatively connected to said subsignal output terminals and responsive to said switching signal, for outputting said subsignal received through said respectively associated protection line to the corresponding one of said subsignal output terminals, the remaining subsignals, a are transmitted through said working lines, being output to the remaining output terminals, respectively;

transmitting side main signal switching means having a plurality of main signal input terminals and a plurality of output terminals operatively connected to the input sides of said plurality of working lines and said respectively associated protection line, for connecting said main signal input terminals to the input sides of said working lines respectively and for selectively connecting, in response to said switching signal, the corresponding one of said main signals to the input side of said selected protection line; and receiving side main signal switching means having a plurality of main signal output terminals, for connecting, in response to said switching signal, the output sides of said working lines, except for the said too deteriorated working line, to the corresponding main signal output terminals and for selectively connecting, in response to said switching signal, the output side of said selected protection line to the corresponding main signal output terminal.

2. A subsignal transmitting system as claimed in claim 1, wherein said switching signal transmission line is an opposite direction protection line for transmitting an opposite-direction multiplexed signal including an opposite-direction main signal and an opposite-direction subsignal, said switching signal being included in said opposite-direction subsignal.

3. A subsignal transmitting system as claimed in claim 1, wherein said subsignals include switching signals each indicating whether the corresponding one of said working lines is too deteriorated for transmission of the corresponding multiplexed signal.

4. A subsignal transmitting system as claimed in claim 3, wherein said subsignals further include orderwire signals.

5. A subsignal transmitting system as claimed in claim 3, wherein said subsignals further include way side signals.

6. A subsignal transmitting system as claimed in claim 1, further comprising:

transmitting terminal equipment means, operatively connected to said transmitting side switching means, for inserting said input subsignals into said main signals to form and transmit said multiplexed signals;

receiving terminal equipment means, operatively connected to said receiving side switching means, for dropping said subsignals from said multipexed signals to output said output main signals and said output subsignals; and at least one intermediate repeater means, operatively connected between said transmitting terminal equipment means and said receiving terminal equipment means, for dropping necessary subsignals from said multiplexed signals and for inserting necessary subsignals into said multiplexed signals.

7. A subsignal transmitting system as claimed in claim 7, wherein said transmitting side subsignal switching means comprises:

switching signal detecting means, operatively connected to said switching signal transmission line for detecting said switching signal; and first subsignal selecting means , operatively connected to said switching signal detecting means and to said subsignal input terminals, for selecting. in response to said detected switching signal, a subsignal corresponding to the deteriorated working line to be inserted into said protection line.

8. A subsignal transmitting system as claimed in claim 7, wherein said receiving side subsignal switching means comprises:

a plurality of subsignal selecting means (13,14), provided to respectively correspond to said plurality of working lines and operatively connected to said plurality of working lines. to said protection line and to said output subsignal termnals, for selecting, in response to said switching signal from said receiving side switching means, the subsignals from said working lines or from said protection line.

9. A subsignal transmitting system as claimed in claim 8, further comprising:

intermediate switching signal detecting means operatively connected to said switching signal transmission line for detecting said switching signal;

a plurality of dropping subsignal selecting means provided to respectively correspond to said plurality of working lines and connected to said intermediate switching signal detecting means. for selectively dropping. In response to said switching signal from said intermediate switching signal detecting means, subsignals from said working lines or from said protection line; and inserting subsignal selecting means, operatively connected to said intermediate switching signal detecting means and to said protection line, for selectively inserting, n response to said switching signal from said intermediate switching signal detecting means, one of said input subsignals into said protection line.

10. A subsignal transmitting system as claimed in claim 9, wherein said transmitting terminal equipment means comprises. corresponding to each of said working lines, a data service channe unit for multiplexing the corresponding input main signal with the corresponding input subsignal to form a multiplexed signal, and a transmitter for transmitting said multiplexed signal to the corresponding working line, and comprises, corresponding to said protection line, a data service channel unit for multiplexing the selected main signal with the selected subsignal.

11. A subsignal transmitting system as claimed in claim 9, wherein said intermediate repeater means comprises, corresponding to each of said working lines and said protection line, a receiver for receiving the multiplexed signal from the corresponding transmitter, a data service channel unit for dropping the subsignal from the multiplexed signal output from said receiver and for inserting an input subsignal into the corresponding working line, and a transmitter for transmitting the multiplexed signal from the data service channel unit to the corresponding working line.

12. A subsignal transmitting system as claimed in claim 9, wherein said receiving terminal equipment means comprises, corresponding to each of said working lines and said protection line, a receiver for receiving the multiplexed signal from the corresponding transmitter in said intermediate repeater means, and a data serve channel unit for dropping the subsignal from the multiplexed signal output from said receiver.

* * * * *

UNITED STATES PATENT AND TRADEMARK OFFICE
CERTIFICATE OF CORRECTION

PATENT NO. : 4,967,406
DATED : Oct. 30, 1990                    Page 1 of 5
INVENTOR(S) : YAGI et al.

It is certified that error appears in the above-identified patent and that said Letters Patent is hereby corrected as shown below:

```
Col. 1, line 44, change "nal s" to --nals--.

Col. 2, line 31, change "nectng" to --necting--;
        line 44, change "operative}y" to --operatively--;
        line 53, change "termina" to --terminal--;
        line 55, change "subsignal]s" to --subsignals--;
        line 58, after "unit" change "." to --,--;
        line 64, after "signal" change "." to --,--.

Col. 3, line 5, change "subsignal]s" to --subsignals--;
        line 11, change "." to --,--;
        line 23, change "termina" to --terminal--;
        line 36, change "channe" to --channel--;
        line 42, change "termina" to --terminal--;
        line 55, change "hock" to --block--;
        line 63, change "bock" to --block--;
        line 65, change "A" to --a--;
        line 67, change "5" to --5A--.

Col. 4, line 9, change "n" to --In--;
        line 11, change "." to --,--;
        line 13, change "." (both occurrences) to --,--,
        and change "lines(" to --lines--;
        line 14, before "in" insert --(--, and change "he"
        to --the--;
        line 19, change "B" to --b--;
        line 24, change "." to --,--, and change "The" to
        --the--;
        line 28, change "multiplexed" to --multiplexed--;
        line 45, change "The" to --the--;
```

UNITED STATES PATENT AND TRADEMARK OFFICE
CERTIFICATE OF CORRECTION

PATENT NO. : 4,967,406
DATED : Oct. 30, 1990
INVENTOR(S) : YAGI et al.

It is certified that error appears in the above-identified patent and that said Letters Patent is hereby corrected as shown below:

Col. 4, line 47, change "termina" to --terminal--;
line 54, change "possiblele" to --possible--;
line 64, change "." to --,--.

Col. 5, line 8, change "pace" to --place--;
line 29, change "taneous y" to --taneously--;
line 34, change "." to --,--;
line 58, change "." to --,--, and change "The" to --the--;
line 64, after "c'" insert --.--;
line 66, change "." to --,--.

Col. 6, line 1, change "." to --,--;
line 21, change "seects" to --selects--;
line 26, change "he" to --the--;
line 29, change "termina" to --terminal--;
line 36, change "wi" to --will--;
line 40, change "1ine" to --line--;
line 42, change "termina" to --terminal--;
line 50, change "circut" to --circuit--;
line 51, change "q" to --9--;
line 57, change "suhsigna" to --subsignal--;
line 62, change "se!ecting" to --selecting--;
line 63, delete "z,", and change "1Q" to --10--;
line 64, change "lg" to --19--.

Col. 7, line 9, change "termina" to --terminal--;
line 11, change "termina" to --terminal--;
line 18, change "seects" to --selects--;
line 20, delete "to the selecting circuit";

UNITED STATES PATENT AND TRADEMARK OFFICE
CERTIFICATE OF CORRECTION

PATENT NO. : 4,967,406

DATED : Oct. 30, 1990

INVENTOR(S) : YAGI et al.

Page 3 of 5

It is certified that error appears in the above-identified patent and that said Letters Patent is hereby corrected as shown below:

```
Col. 7, line 21, delete "(SEL) q. The selecting signal";
        line 37, change "." to --,--, and change "The" to
        --the--;
        line 44, change "bock" to --block--;
        line 46, change "n" to --in--;
        line 48, change "serial-to parallel" to
        --serial-to-parallel--;
        line 50, change "a)" to --(a)--;
        line 52, change "Converter" to --converter--;
        line 53, change "parael" to --parallel--;
        line 57, change "." to --,--;
        line 61, change ")" to --(c)--;
        line 62, change ")" to --(c)--;
        line 65, change "bock" to --block--;
        line 68, change "seector" to --selector--.

Col. 8, line 3, change "cl" to --c1--;
        line 4, change "seector" to --selector--;
        line 5, change "H" to --8--;
        line 6, change "cl" to --c1--;
        line 11, change "take" to --table--;
        line 16, change "signal)s cl" to --signals c1--;
        line 17, change "seector" to --selector--;
        line 18, change "The" to --the--;
        line 20, change "forgoing" to --foregoing--, and
        change "." to --,--;
        line 28, change "." to --,--, change "The" to
        --the--, and change "dummY" to --dummy--;
        line 34, delete "," (first occurrence), and before
        "is" insert --it--;
        line 46, change "liens" to --lines--.
```

UNITED STATES PATENT AND TRADEMARK OFFICE
CERTIFICATE OF CORRECTION

PATENT NO. : 4,967,406

DATED : Oct. 30, 1990

INVENTOR(S) : YAGI et al.

Page 4 of 5

It is certified that error appears in the above-identified patent and that said Letters Patent is hereby corrected as shown below:

```
Col. 9, line 6, before "lines" insert --working--;
        line 13, change "a" to --as--.

Col. 10, line 6, change "7" to --6--;
         line 9, after "line" insert --,--;
         line 11, change "means ," to --means,--;
         line 20, delete "(13,14)";
         line 30, after "means" insert --,--;
         line 32, after "line" insert --,--;
         line 37, change "." to --,--, and change "In" to
         --in--;
         line 52, change "channe" to --channel--.

Col. 12, line 3, change "serve" to --service--.

Col. 8, line 6, before "bits" insert --3--.
```

UNITED STATES PATENT AND TRADEMARK OFFICE
CERTIFICATE OF CORRECTION

PATENT NO. : 4,967,406

DATED : Oct. 30, 1990

INVENTOR(S) : Yagi et al

It is certified that error appears in the above-identified patent and that said Letters Patent is hereby corrected as shown below:

Col 8, line 46, between "working" and "protection" insert --and--.

Col. 10, line 36, after "means", "." should be --,--.

Signed and Sealed this

Twenty-second Day of December, 1992

Attest:

DOUGLAS B. COMER

*Attesting Officer*  *Acting Commissioner of Patents and Trademarks*